United States Patent [19]

Borovsky

[11] Patent Number: 4,949,814

[45] Date of Patent: Aug. 21, 1990

[54] DRIVING MECHANISM, AND VEHICLE THEREWITH

[75] Inventor: Anatoly Borovsky, Brooklyn, N.Y.

[73] Assignee: Nachum D. Donner, Brooklyn, N.Y.

[21] Appl. No.: 436,220

[22] Filed: Nov. 14, 1989

[51] Int. Cl.[5] .......................... F03G 1/04; F03G 1/08; B60K 8/00

[52] U.S. Cl. ...................................... 185/11; 180/54.2; 185/39; 185/40 R

[58] Field of Search .................. 185/9, 10, 11, 37, 39, 185/40 R, DIG. 1; 180/54.2; 446/457, 464

[56] References Cited

U.S. PATENT DOCUMENTS

| 212,977 | 3/1879 | Plattenburg | 185/39 |
|---|---|---|---|
| 471,888 | 3/1892 | Parker | 185/9 |
| 1,042,660 | 10/1912 | Evans | 185/39 |
| 1,440,126 | 12/1922 | Aust | 180/54.2 X |
| 1,730,634 | 10/1929 | Spencer | 446/457 |
| 4,315,562 | 2/1982 | Tangorra et al. | 267/73 X |
| 4,543,922 | 10/1985 | Fugazza et al. | 185/39 X |
| 4,629,438 | 12/1986 | McAneny | 185/39 X |
| 4,715,476 | 12/1987 | FRX | 185/39 X |

FOREIGN PATENT DOCUMENTS

| 864973 | 2/1941 | France | 185/DIG. 1 |
|---|---|---|---|
| 54548 | 10/1949 | France | 446/457 |
| 61527 | 4/1924 | Sweden | 185/37 |
| 123464 | 2/1919 | United Kingdom | 446/457 |
| 134457 | 11/1919 | United Kingdom | 185/37 |

*Primary Examiner*—Allan D. Herrmann
*Attorney, Agent, or Firm*—I. Zborovsky

[57] ABSTRACT

A driving mechanism includes a rotatable support and a stretchable element which is being wound on the support by rotating the latter in one direction, and when the rotatable support is released the stretched element compresses and forcedly rotates the rotatable support in an opposite direction, thus providing a driving force in the opposite direction.

18 Claims, 2 Drawing Sheets

DRIVING MECHANISM, AND VEHICLE THEREWITH

BACKGROUND OF THE INVENTION

The present invention relates to a driving mechanism, as well as to a vehicle provided with it.

Drives or driving mechanisms are known in many various forms, including electric, hydraulic, pneumatic and mechanical drives. Among mechanical drives, a drive with spring means is known. The drive includes a spring or springs which are initially wound to be compressed and then the springs unwind and convert the potential energy accumulated during winding, into kinetic energy of driving an object. While the spring drive uses the accumulated potential energy due to compression of the springs, the finally produced kinetic energy is relatively low and cannot provide for a long driving distance without recharging after a relatively short time. Therefore a vehicle using such drive covers only a short distance before a next compression of the springs must be performed.

SUMMARY OF THE INVENTION

Accordingly, it is an object of the present invention to provide a driving mechanism which avoids the disadvantages of the prior art.

It is also an object of the present invention to provide a vehicle which has a new driving mechanism.

In keeping with these objects and with others which will become apparent hereinafter, one feature of the present invention resides, briefly stated in a driving mechanism which has a rotatable support and a stretcheable element which, with one end fixed, is wound on the rotatable support so that the stretcheable element is stretched during winding on, and then when the rotatable support is released the strecheable element is compressed back to its initial length and forcedly rotates the rotatable support in an opposite direction. This rotation of the rotatable support in an opposite direction is used as a driving movement to produce a driving force.

Another object of the present invention is to provide a vehicle which utilizes the new driving mechanism for its propelling. The vehicle can be of any type, such as for example, an automobile, a boat, a plane, etc.

In accordance with another feature of the present invention, the driving mechanism is provided with guides for guiding the stretcheable element during winding and unwinding. The guides can be spaced in direction of movement of the stretcheable element and located in two opposite directions relative to one another.

Still another advantageous feature of the present invention is that the stretcheable element can be composed of a plurality of coextensive stretcheable members moveable together. In this case, the members can be stretched individually more than a wide single element, and thereby more potential energy can be stored during winding on, and converted into kinetic energy during unwinding.

Each guide can be composed of a plurality of individual guiding portions each guiding a respective one of the guiding members. The working surfaces of the guides can be formed as low-friction surfaces, for example polished. The guiding portions can be separated from one another by projections which can also be polished on its sides facing the stretcheable members.

The rotatable member, the stretcheable element, the guides can be all arranged in a joint housing which can be filled with an anti-friction medium, for example oil, to reduce friction between the respective parts of the driving mechanism.

Changes of speed of the driving mechanism, including acceleration, deceleration, braking, can be performed by a brake which acts on the stretcheable element so as to brake or release the same in its unwinding or compressing movement.

The novel features of the present invention are set forth in particular in the appended claims. The invention itself, however, both as to its construction and its manner of operation will be best understood from the following description of preferred embodiments which is accompanied by the following drawings.

DESCRIPTION OF PREFERRED EMBODIMENTS

Figure 1:
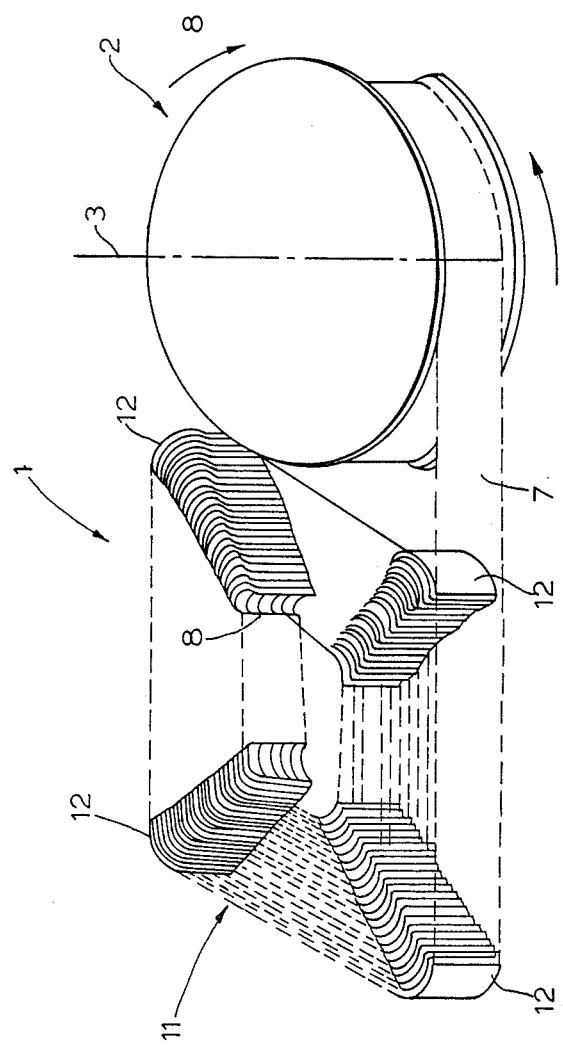
FIG. 1 is a view which schematically shows a driving mechanism in accordance with the present invention.
Figure 3:
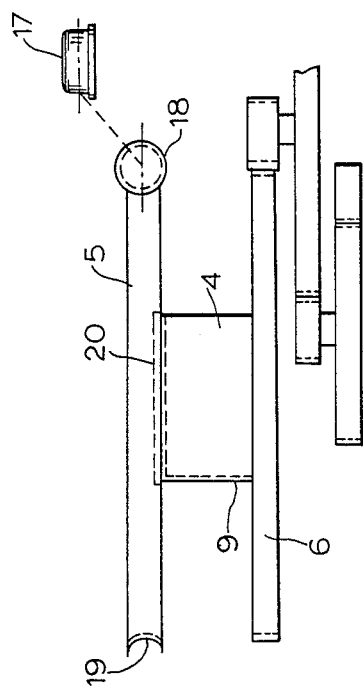
FIG. 3 is a view schematically showing an auxiliary drive and a transmission of the invention driving mechanism.
Figure 2:
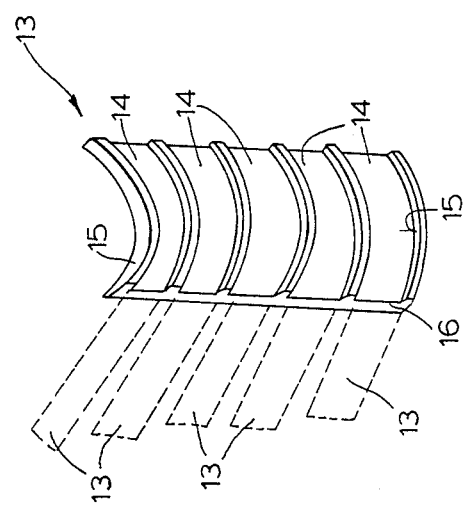
FIG. 2 is a perspective view showing schematically a guide element for a stretcheable element of the invention driving mechanism.
Figure 4:
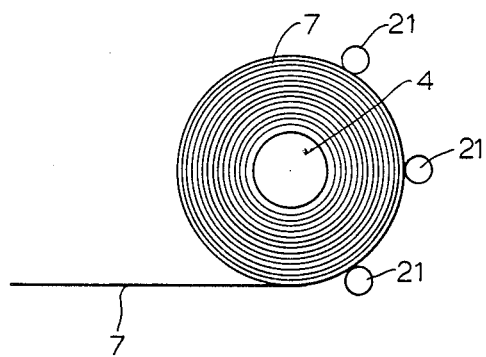
FIG. 4 schematically shows a braking system of the invention driving mechanism.
Figure 5:
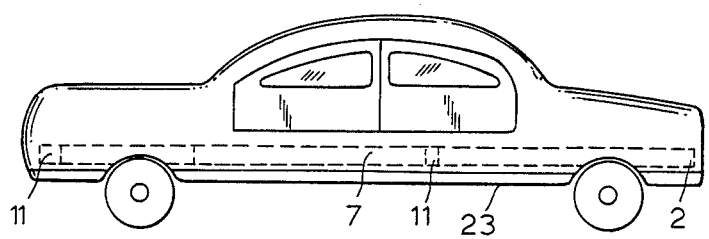
FIG. 5 schematically shows a vehicle provided with the inventive driving mechanism.

A driving mechanism in accordance with the present invention is identified as a whole with reference numeral 1. It has a rotatable support 2 which can rotate about its axis 3. The rotatable support 2 can be formed as a drum which has a central core 4 of a smaller diameter and two lateral axially spaced discs 5 and 6 which form lateral limiting walls of the drum and have a considerably greater diameter than the core 4.

The driving mechanism further includes a stretcheable element 7 which can be formed for example of stretcheable rubber, plastic, etc. One end of the stretcheable element 7 which is identified as 8 is fixed to a point outside of the rotatable support 2, while the other end 9 is fixed to the rotatable support.

The driving mechanism generally operates in the following manner.

The drum 2 is first rotated in direction of the arrow A to wind the stretcheable element 7 on the drum with pre-stretching and the drum is fixed in a respective position. Then when the drum is released, the stretcheable element tends to compress and forcedly rotates the rotatable support in an opposite direction B. This rotation is a driving movement which provides a driving force of the driving mechanism.

The driving mechanism is further provided with guiding means 11 which guides the stretcheable element during its winding on the drum 2 and unwinding from the latter. The guiding means include a plurality of guides 12 which are spaced from one another in direction of movement of the stretcheable element 7. The guides can be offset relative to one another in two opposite directions, to provide a compact construction. The end 8 of the stretcheable element 7 can be fixed to one of the guides as shown in the drawings.

The stretcheable element 7 can be composed of a plurality of stretcheable members 13 which are located and adjacent to one another in a transverse direction. In this case, higher stretching can be achieved with accumulating of more potential energy during winding on, since the individual stretcheable members can be stretched more than a single wide stretcheable element. Then during unwinding, more kinetic energy will be produced. The stretcheable members 13 are coextensive and move jointly with each other.

For guiding the stretcheable members 13 each guide 12 has a plurality of guiding portions 14 each guiding a respective one of the stretcheable members 13. The guiding portions can be formed by partitions 15 provided between the guiding portions on each of the guides 12. The partitions can be formed as ribs, thus performing a double function of separating the guiding portions and reinforcing the guides.

In order to reduce friction, a working surface 16 of each guide can have a reduced friction characteristic, for example it can be polished. Also the partitions as a whole or their portions to be in contact with the stretcheable members can also be made with antifriction characteristic, for example polished.

For rotating the drum 2 in direction of the arrow A and winding the stretcheable element 7 on it, a rotary auxiliary drive can be provided. Such a drive can include for example an electric motor 17. A transmission can also be provided between an electric motor 17 and the drum 2, including a worm shaft 18 and a worm gear 19 engageable with the latter. Also a coupling 20 can be provided so as to connect the auxiliary drive with the drum for rotating the drum in the direction A, and disconnect the auxiliary drive from the drum for allowing the rotation of the drum in the direction B.

Means can be provided for changing the speed of the driving mechanism, for acceleration, deceleration, braking thereof. This means can include a brake unit which is not shown in detail. The braking unit can be formed for example as a hydraulic brake having a rotatable brake roller 21. The brake roller 21 can be brought in direct contact with the stretcheable element 7 in the region of the drum, and when a braking or deceleration in needed, the rotation of the roller 21 can be stopped to apply pressure on the stretcheable element 7 and to stop its unwinding movement. For acceleration, the roller 21 is released more or less to allow faster or slower unwinding movement of the stretcheable element 7.

For providing a proper rotation of an end element to be rotated by the inventive mechanism, for example the wheels of a vehicle, a transmission 22 can be further provided. It can include a plurality of gears with a transmission ratio selected so as to provide a desired speed of rotation of the wheels. Since it is desirable to arrange the drum so that its axis extends in a vertical direction, and so are the axes of the transmission gears, the last stage or the transmission can be a bevel gear unit for converting the rotation of the transmission gear about the vertical axis into the rotation of the vehicle about a horizontal axis.

The rotatable member 2, the stretcheable element 7 and the guides 11 can be accommodated in a common housing 23. The housing can be filled with a friction reducing medium, for example friction reducing oil, to reduce friction between all parts of the driving mechanism, and also between the convolutions of the stretcheable element 7.

When the driving mechanism of the invention is utilized for a car, the housing and the whole driving mechanism can be located at the bottom of the car and occupy its whole bottom area.

The driving mechanism in accordance with the present invention is enviromentally clean, efficient and simple.

The invention is not limited to the details shown since various modifications and structural changes are possible without departing in any way from the spirit of the present invention.

What is desired to be protected by Letters Patent is set forth in the appended claims.

I claim:

1. A driving mechanism, comprising
   an elongated stretcheable band-like
   a rotatable support arranged so that when one end of said stretcheable element is fixed and said rotatable support is rotated in one direction, said stretcheable element is wound on said support with stretching, and then when said rotatable support is released said stretcheable element compresses and rotates said rotatable support in an opposite direction so that said rotatable support provides a driving force in said opposite direction, said stretcheable element being composed of a plurality of stretcheable members which are spaced from one another in a direction which is transverse to direction of elongation of said stretcheable element; and
   guiding means for guiding said stretcheable element during its winding on said rotatable support and unwinding from the latter, said guiding means including a plurality of portions each guiding a respective one of said stretcheable members, said guiding means including a one piece integral guide provided with a plurality of partitions subdividing said guide into said guiding portions.

2. A driving mechanism as defined in claim 1, wherein said elongated stretcheable element is composed of stretcheable rubber.

3. A driving mechanism as defined in claim 1, wherein said rotatable support is formed as a rotatable drum.

4. A driving mechanism as defined in claim 3, wherein said drum has a central core and two axially spaced walls with an area considerably greater than a cross section of said core, so as to form axially limiting walls for said stretcheable element.

5. A driving mechanism as defined in claim 1; and further comprising means for rotating said rotatable support in said one direction so as to wind said stretcheable element on said rotatable support and to stretch said stretcheable element.

6. A driving mechanism as defined in claim 5, wherein said means for rotating said rotatable support in said one direction includes a motor.

7. A driving mechanism as defined in claim 6, wherein said motor of said means for rotating is formed as an electric motor.

8. A driving mechanism as defined in claim 6, wherein said means for rotating said rotatable support further includes transmission means connecting said motor with said rotatable support with a predetermined transmission ratio.

9. A driving mechanism as defined in claim 1; and further comprising means for guiding said stretcheable element during its winding on said rotatable support and unwinding during rotation of said rotatable support in said opposite direction.

10. A driving mechanism as defined in claim 9, wherein said guiding means includes a plurality of guides which are spaced from one another in direction of movment of said stretcheable element.

11. A driving mechanism as defined in claim 10, wherein said guides are spaced from one another in two mutually transverse directions.

12. A driving mechanism as defined in claim 9; and further comprising a substantially closed housing accommodating said streatcheable element, said rotatable support and said guiding means.

13. A driving mechanism as defined in claim 12, wherein said housing is filled with a medium which reduces friction between said stretcheable element, said guiding means and said rotatable support.

14. A driving mechanism as defined in claim 1, wherein said guiding means has a surface facing toward said stretcheable element, said surface being formed as a low-friction surface to reduce friction between said stretcheable element and said guiding means.

15. A driving mechanism, comprising
an elongated stretcheable band-like element;
a rotatable support arranged so that when one end of said stretcheable element is fixed and said rotatable support is rotated in one direction, said stretcheable element is wound on said support with stretching, and then when said rotatable support is released said stretcheable element compresses and rotates said rotatable support in an opposite direction so that said rotatable support provides a driving force in said opposite direction, said stretcheable element being composed of a plurality of stretcheable members which are spaced from one another in a direction which is transverse to direction of elongation of said stretcheable element; and
guiding means for guiding said stretcheable element during its winding on said rotatable support and unwinding from the latter, said guiding means including a plurality of portions each guiding a respective one of said stretcheable members, said guiding means including a plurality of one piece integral guides each provided with a plurality of partitions subdividing each of said guides into said guiding portions.

16. A vehicle, comprising
a body; and
a driving mechanism including an elongated stretcheable band-like element, a rotatable support arranged so that when one end of said stretcheable element is fixed and said rotatable support is rotated in one direction, said stretcheable element is wound on said support with stretching, and then when said rotatable support is released said stretcheable element compresses and rotates said rotatable support in an opposite direction so that when said rotatable support provides a driving force in said opposite direction, said stretcheable element being composed of a plurality of stretcheable members which are spaced from one another in a direction which is transverse to direction of elongation of said stretcheable element, and guiding means for guiding said stretcheable element during its winding on said rotatable support and unwinding from latter, said guiding means including a plurality of portions each guiding a respective one of said stretcheable members, said guiding means including a one piece integral guide provided with a plurality of partitions subdividing said guide into said guiding portions.

17. A vehicle as defined in claim 16; and further comprising means for changing a speed of the vehicle, said speed changing means including means for acting on said stretcheable element so as to influence its compression and unwinding.

18. A vehicle, comprising
a body; and
a driving mechanism including an elongated stretcheable band-like element, a rotatable support arranged so that when one end of said stretcheable element is fixed and said rotatable support is rotated in one direction, said stretcheable element is wound on said support with stretching, and then when said rotatable support is released said stretcheable element compresses and rotates said rotatable support in an opposite direction so that when said rotatable support provides a driving force in said opposite direction, said stretcheable element being composed of a plurality of stretcheable members which are spaced from one another in a direction which is transverse to direction of elongation of said stretcheable element during its winding on said rotatable support and unwinding from the later, said guiding means including a plurality of portions each guiding a respective one of said stretcheable members, said guiding means including a plurality of one piece integral guides each provided with a plurality of partitions subdividing each of said guides into said guiding portions.

* * * * *